United States Patent
Yang et al.

(10) Patent No.: US 9,230,500 B2
(45) Date of Patent: Jan. 5, 2016

(54) EXPANDED 3D STEREOSCOPIC DISPLAY SYSTEM

(75) Inventors: Ung-Yeon Yang, Daejeon (KR); Hye-Mi Kim, Daejeon (KR); Jin-Ho Kim, Daejeon (KR); Ki-Hong Kim, Daejeon (KR); Gil-Haeng Lee, Seoul (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 627 days.

(21) Appl. No.: 13/565,421

(22) Filed: Aug. 2, 2012

(65) Prior Publication Data

US 2013/0222548 A1    Aug. 29, 2013

(30) Foreign Application Priority Data

Feb. 23, 2012    (KR) ........................ 10-2012-0018690

(51) Int. Cl.
| | | |
|---|---|---|
| *H04N 13/02* | (2006.01) | |
| *G09G 5/00* | (2006.01) | |
| *H04N 13/00* | (2006.01) | |
| *H04N 13/04* | (2006.01) | |

(52) U.S. Cl.
CPC ............. *G09G 5/00* (2013.01); *H04N 13/0048* (2013.01); *H04N 13/02* (2013.01); *H04N 13/0242* (2013.01); *H04N 13/0459* (2013.01); *H04N 13/0484* (2013.01)

(58) Field of Classification Search
CPC . H04N 5/64; H04N 13/0402; H04N 13/0029; H04N 13/0409; H04N 13/0436; H04N 13/0438; H04N 13/044; H04N 13/0048; H04N 13/0055; H04N 13/0059; H04N 13/0242; H04N 7/181; H04N 9/12; H04N 9/30; H04N 21/816; H04N 13/00
USPC .................................... 348/42, 46, 47, 51–53
See application file for complete search history.

(56) References Cited

U.S. PATENT DOCUMENTS

| | | | |
|---|---|---|---|
| 7,580,463 B2 * | 8/2009 | Routhier et al. .......... | 375/240.25 |
| 7,804,507 B2 | 9/2010 | Yang et al. | |
| 8,314,832 B2 * | 11/2012 | Mann et al. ...................... | 348/51 |
| 8,896,675 B2 * | 11/2014 | Moliton et al. .................. | 348/53 |
| 2006/0132915 A1 | 6/2006 | Yang et al. | |

FOREIGN PATENT DOCUMENTS

| | | |
|---|---|---|
| KR | 100656342 B1 | 6/2006 |
| KR | 100809479 B1 | 1/2008 |
| KR | 1020120054507 A | 5/2012 |

OTHER PUBLICATIONS

Gun A. Lee et al, "Layered Multiple Displays for Immersive and Interactive Digital Contents", Proceedings of the 5th international conference on Entertainment Computing, 2006, pp. 123-134, vol. 4161.

* cited by examiner

*Primary Examiner* — Trang U Tran

(57) ABSTRACT

An expanded three-dimensional (3D) stereoscopic image display system is provided. The expanded 3D stereoscopic image display system according to an embodiment of the present invention provides a display platform that presents integrated services by fusing homogeneous and heterogeneous display devices in a single space, and an operation technique of the display platform.

7 Claims, 20 Drawing Sheets

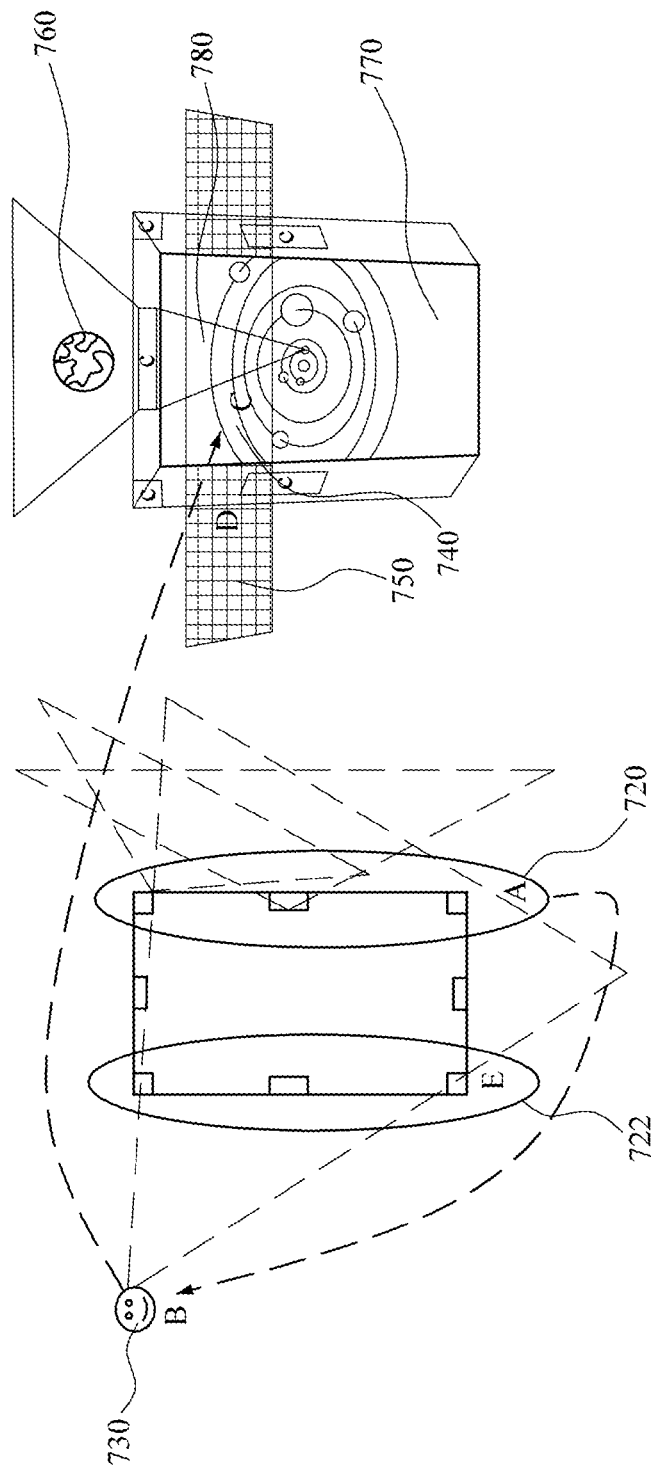

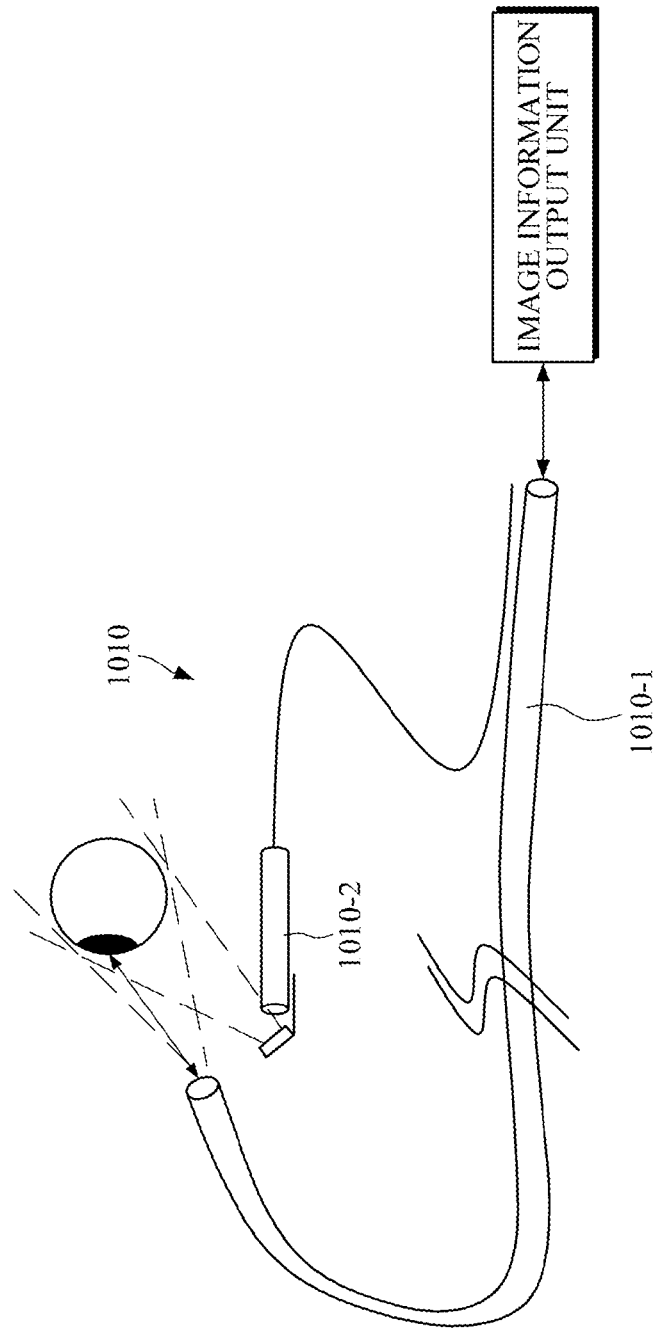

EXPANDED 3D STEREOSCOPIC DISPLAY SYSTEM

CROSS-REFERENCE TO RELATED APPLICATION

This application claims the benefit under 35 U.S.C. §119 (a) of Korean Patent Application No. 10-2012-0018690, filed on Feb. 23, 2012, the entire disclosure of which is incorporated herein by reference for all purposes.

BACKGROUND

1. Field

The following description relates to display platform technology that visualizes a 3D stereoscopic image, and more particularly, to technology that provides digital content service utilizing the display platform technology.

2. Description of the Related Art

Three-dimensional (3D) stereoscopic image technology which is being popularized in movies, television (TV), and the like generally uses a binocular disparity effect, which refers to a difference in image location of a 3D object seen by the left and right eyes of an observer, among various human factors which contribute to a 3D stereoscopic effect. However, 3D stereoscopic image presentation technology based on the binocular disparity effect has limitations which are fundamentally difficult to overcome when representing a natural 3D stereoscopic effect. For example, in the above-described technology, images having virtual depth, which are formed in front of and behind an image output surface (for example, LCD or screen) at a fixed distance, are presented to users by outputting binocular disparity information on the image output surface, and therefore an accommodation-convergence mismatch problem due to an increase in the stereoscopic effect is created, which significantly fatigues the human visual motion and cognitive structure.

The accommodation-convergence mismatch problem is a phenomenon in which a convergence distance and a focal distance do not match. Convergence refers to a simultaneous inward movement of eyes toward each other with respect to a target object, and a user focuses on the image output surface while convergence is formed in front of and behind the image output surface, so that the convergence distance and the focal distance do not match. Commercial 3D stereoscopic imaging devices (for example, 3D TV, 3D cinema, autostereoscopic 3D display, HMD, EGD, and the like), excluding a pure holographic output device for recording and restoring an image using a laser light source, are all stereoscopic image output devices based on binocular disparity, and thereby have the above-described problem. Accordingly, existing systems try to reduce adverse effects by changing a viewing environment such as content, viewing time limit, viewing position limit, and the like. However, as this fundamental problem has not been resolved, social awareness about side effects is increasing, and recently, interest within the industrial and research worlds has increased, as evidenced by the establishment of organizations such as the Human Factor Research Institute and Forums concerning 3D stereoscopic images.

Interactive hologram display technology, which is 3D image presentation technology presented in content such as movies, is ideal display technology that is perfectly adapted to human stereoscopic visual recognition characteristics. However, it is difficult to obtain high visual quality and to realize interactive hologram display technology, in future science fiction films for example, at the current level of technology, in which a virtual hologram effect is achieved utilizing a reflective optical structure, only still images are represented, etc. This may lead to misunderstanding about 3D stereoscopic image commercialization technology and disappointment about current technology among average consumers.

3D movies and 3D TV attract public interest, and thus commercials employ high-level 3D stereoscopic effects such as a ball coming out of a screen and rolling right by a viewer. Such phenomena may be interpreted as an expression of the desires of manufactures and users to enjoy realistic stereoscopic content through 3D stereoscopic imagery. However, in the above-described technology based on the binocular disparity effect, when a target object to be observed strays from a range of a view volume defined between an image output screen of a display device and user's eyes, or when the target object is represented by an excessive stereoscopic effect, human factor issues (for example, eye pain, dizziness, and the like) occur, and thus the technology is actually only being used for virtual commercial images.

SUMMARY

The following description relates to display platform technology that visualizes a three-dimensional (3D) stereoscopic image, and an expanded 3D stereoscopic image display system that provides digital content service utilizing the display platform technique.

In one general aspect, there is provided an expanded 3D stereoscopic image display system, including: a plurality of display devices that provide 3D stereoscopic image display spaces; and a control unit that sets the 3D stereoscopic image display spaces for each display device to divide or share a physical space for displaying a 3D stereoscopic image for each display device, and distributes content to each display device based on at least one of the 3D stereoscopic image display spaces set for each display device, production scenario of the content, and line of vision information of a user to thereby fuse multiplex 3D stereoscopic images in a single stereoscopic image display space.

In this instance, at least one of the plurality of display devices may be a standing display device that mixes and displays the multiplex 3D stereoscopic images.

In addition, at least one of the plurality of display devices may be a flexible display device whose position and orientation can be changed during preview of the content.

In addition, at least one of the plurality of display devices may be a display device in which an image output portion is formed as a transparent see-through space.

In addition, at least one of the plurality of display devices may be a portable display device that has a transparent display panel or a transparent display function.

In addition, at least one of the plurality of display devices is a wearable display device that detects eye movement to acquire the line of vision information of the user.

Other features and aspects will be apparent from the following detailed description, the drawings, and the claims.

BRIEF DESCRIPTION OF THE DRAWINGS

FIGS. 7A to 7C are reference diagrams illustrating an example in which a flexible display device according to an embodiment of the present invention is used;

FIG. 12 is a drawing showing the external appearance of a non-body-contacting eye tracking unit according to an embodiment of the present invention.

Figure 1:
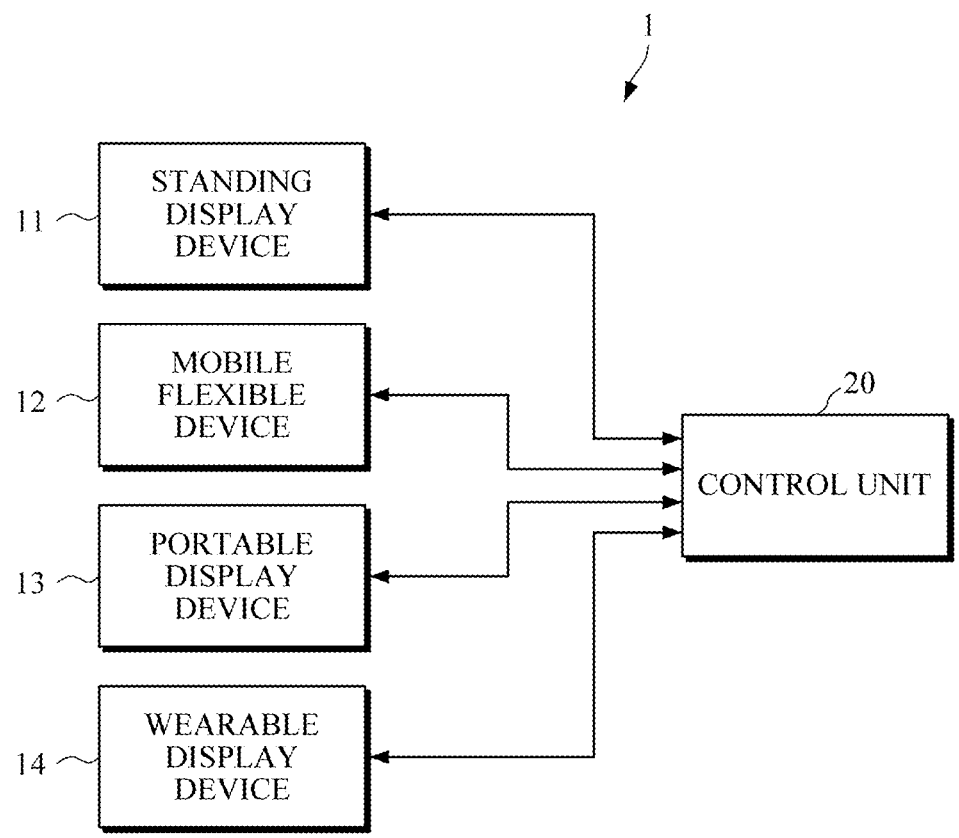
FIG. 1 is a configuration diagram illustrating an expanded three-dimensional (3D) stereoscopic image display system according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, preferred embodiments of the present invention will be described in detail with reference to accompanying drawings.

FIG. 1 is a configuration diagram illustrating an expanded three-dimensional (3D) stereoscopic image display system 1 according to an embodiment of the present invention.

The expanded 3D stereoscopic image display system 1 includes a plurality of display devices and a control unit 20.

The plurality of display devices includes at least one of a standing display device 11, a flexible display device 12, a portable display device 13, and a wearable display device 14.

The present invention aims to reproduce a full experience with respect to the 3D stereoscopic image, and to provide a sense of space with a natural 3D stereoscopic image by overcoming limitations of using a single 3D stereoscopic display device to present a comfortable stereoscopic image output space, for example, by eliminating visual fatigue caused by viewing 3D stereoscopic images in which a feeling of depth is exaggerated.

For this, in the present invention, an expanded 3D (E3D) stereoscopic image display platform and an expanded 3D technique for operating the display platform are proposed, so that multiple 3D stereoscopic images displayed via each of homogeneous or heterogeneous display devices are fused in a single stereoscopic image display space.

Homogeneous or heterogeneous display devices refer to displays that have the same or different H/W configurations and are operated based on an S/W operation environment.

The present invention proposes a stereoscopic image interactive space in which multiple 3D stereoscopic images output from various existing 2D and 3D displays and future display devices are fused in a single stereoscopic image display space to be integrated and controlled.

The above-described homogeneous or heterogeneous display devices may be classified as a standing display device 11, a flexible display device 12, a portable display device 13, and a wearable display device 14, according to proximity to a user.

The standing display device 11 is a display whose installation position can be fixed and may be, for example, a TV, a 3D TV, a general projector, a 3D projector, or the like.

By configuring a stereoscopic image display space so that a single display device or a plurality of 2D and 3D devices are mixed, or by configuring a display space in the form of cave automatic virtual environment (CAVE) filling a peripheral space of a user, a virtual participation space of the user may be expanded to a space transcending physical walls.

The flexible display device 12 is a movable display, and may include a flexible LED display which enables triview-display in which a stereoscopic image display space has three surfaces, quadview-display in which a stereoscopic image display space has four surfaces, hexaview-display in which a stereoscopic image display space has six surfaces, and so on.

In addition, the flexible display device 12 may include a standing display device including movable wheels or the like, for example, a mobile kiosk display.

The portable display device 13 is a mobile display easily carried by a user and may be, for example, a mobile phone, a smart phone, a smart pad, or the like.

The wearable display device 14 is a display worn by a user, and may be, for example, a head mounted display (HMD), an eye glass display (EGD), or the like. The EGD may directly produce a 3D stereoscopic image in the eyes of the user to provide an immersive mixed environment.

For convenience of description, in FIG. 1, one of each of the standing display device 11, the flexible display device 12, the portable display device 13, and the wearable display device 14 is illustrated, but it is not necessary that all four different types of display devices be provided, and at least two display devices of each type may be provided instead.

The control unit 20 sets 3D stereoscopic image display spaces for each display device to divide or share a physical space among display devices to display a 3D stereoscopic image, and distributes content to each of the display devices 11, 12, 13, and 14 based on the 3D stereoscopic image display space set for each display device and user line of vision information to thereby fuse multiplex 3D stereoscopic images in a single stereoscopic image display space.

In FIG. 1, the control unit 20 directly controls each of the display devices 11, 12, 13, and 14, but a separate control unit for controlling each display device may be provided between the control unit 20 and each of the display devices 11, 12, 13, and 14.

For example, a standing display device control unit for controlling the standing display device 1, a flexible display device control unit for controlling the flexible display device 12, a portable display device control unit for controlling the portable display device 13, and a wearable display device control unit for controlling the wearable display device 14 may be provided.

Focusing on a method for mixing and displaying multiple images, the present invention proposes a configuration and operation method of each of the standing display device 11 (see, FIGS. 4 and 5), an autostereoscopic stereoscopic display in the flexible display device 12 (see, FIGS. 6 to 8), a transparent display panel in the portable display device 13 (see, FIG. 9), and an EGD for E3D in the wearable display device 14.

Figure 2:
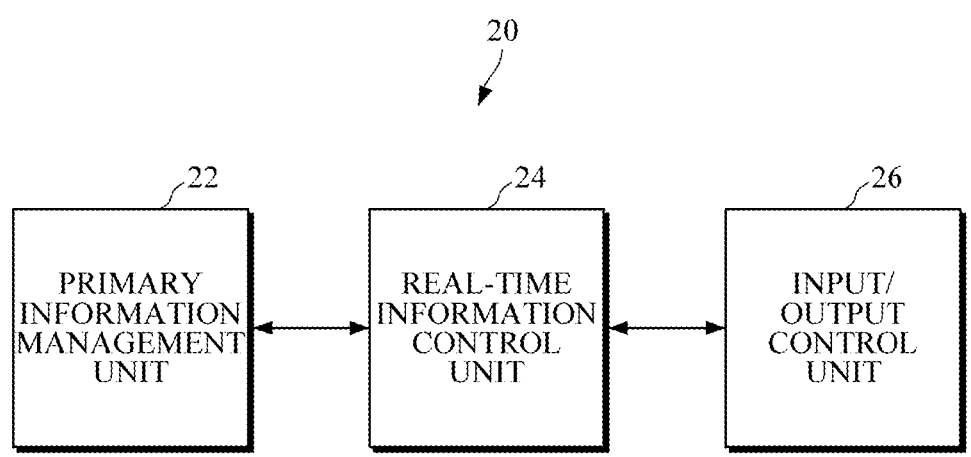
FIG. 2 is a detailed configuration diagram illustrating a control unit of FIG. 1 according to an embodiment of the present invention.

FIG. 2 is a detailed configuration diagram illustrating the control unit 20 of FIG. 1 according to an embodiment of the present invention.

Referring to FIG. 2, the control unit 20 includes a primary information management unit 22, a real-time information control unit 24, and an input/output control unit 26.

The primary information management unit 22 sets a relationship between hardware and software components and ergonomic parameters concerning a user's experience of stereoscopic images in advance, and stores and manages the set information in a database so that a single fused virtual stereoscopic image display space that is finally completed is configured.

The primary information management unit 22 acquires information about an optimal stereoscopic image display space that can be represented by a specific display device included in a mixed reality display platform for presentation of expanded 3D stereoscopic images according to the present embodiment, through a separate protocol from each display device, that is, the standing display device 11, the flexible display device 12, the portable display device 13, and the wearable display device 14.

A stereoscopic display device utilizing a binocular disparity effect may denote a stable virtualization region which enables representation of content providing a natural 3D effect while reducing visual fatigue of the user with respect to an observer and an image output surface.

The stereoscopic image display space represented by each of the display devices 11, 12, 13, and 14 includes a volume of public screen (VPS) represented by the standing display device 11 or the flexible display device 12, a volume of mobile screen (VMS) represented by the portable display device 13, and a volume of personal virtual screen (VpVS) represented by the wearable display device 14.

The real-time information control unit 24 extracts user information concerning one or a plurality of users participating every time an overall system is operated, and changes a parameter set as an initial value in order to present the natural stereoscopic image display space.

The user information may include six degrees of freedom (6 DOF) associated with each of a user's eyes, a view vector indicating a direction of vision, and focusing information, and may also include information about with which type of input/output device and sensor the user currently interacts.

The 6 DOF includes X/Y/Z positional values, and pitch/yaw/roll angle values.

The input/output control unit 26 divides the content based on a multi-user condition and a condition optimized for individuals to transmit the divided content to each of the display devices 11, 12, 13, and 14, and finally fuses multiple 3D stereoscopic images in a single stereoscopic image display space.

FIGS. 3A to 3D are reference diagrams illustrating examples of implementing E3D by presenting a fused stereoscopic image using a plurality of display devices according to various embodiments of the present invention.

Referring to FIGS. 3A to 3D, a stereoscopic image is represented by sharing or dividing a plurality of 3D stereoscopic image display spaces (VPS, VpVS, and MVS) using a plurality of display devices, thereby overcoming limitations of the existing display technology in representation of a sense of 3D space.

Figure 3A:
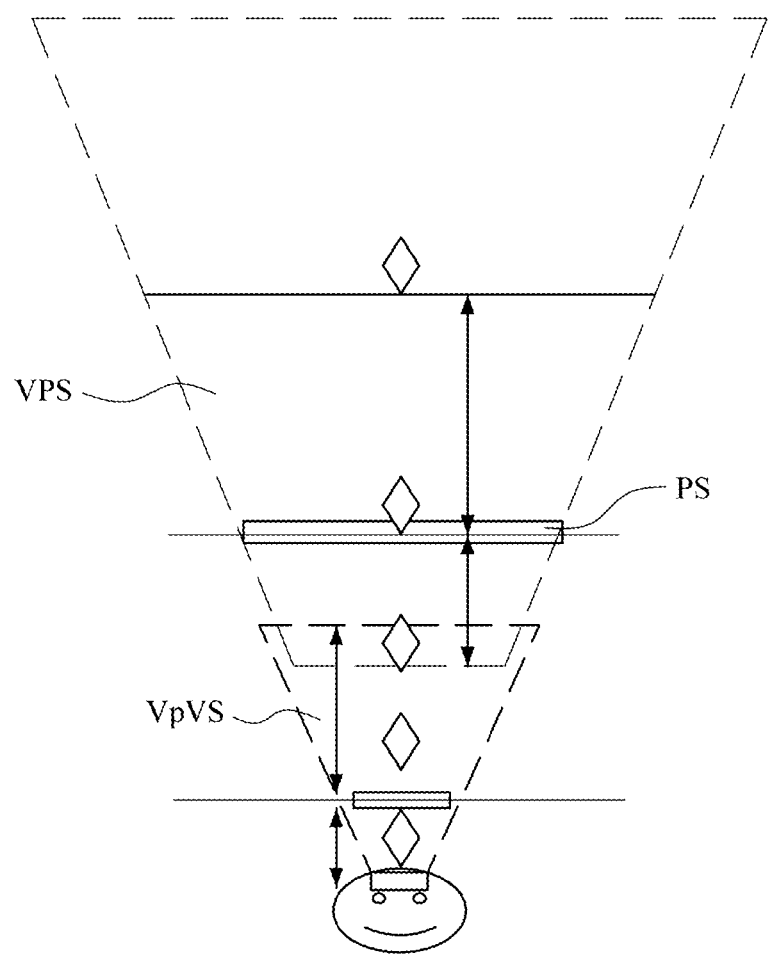
FIGS. 3A to 3D are reference diagrams illustrating examples of implementing E3D by presenting a fused stereoscopic image using a plurality of display devices according to various embodiments of the present invention.
Figure 3B:
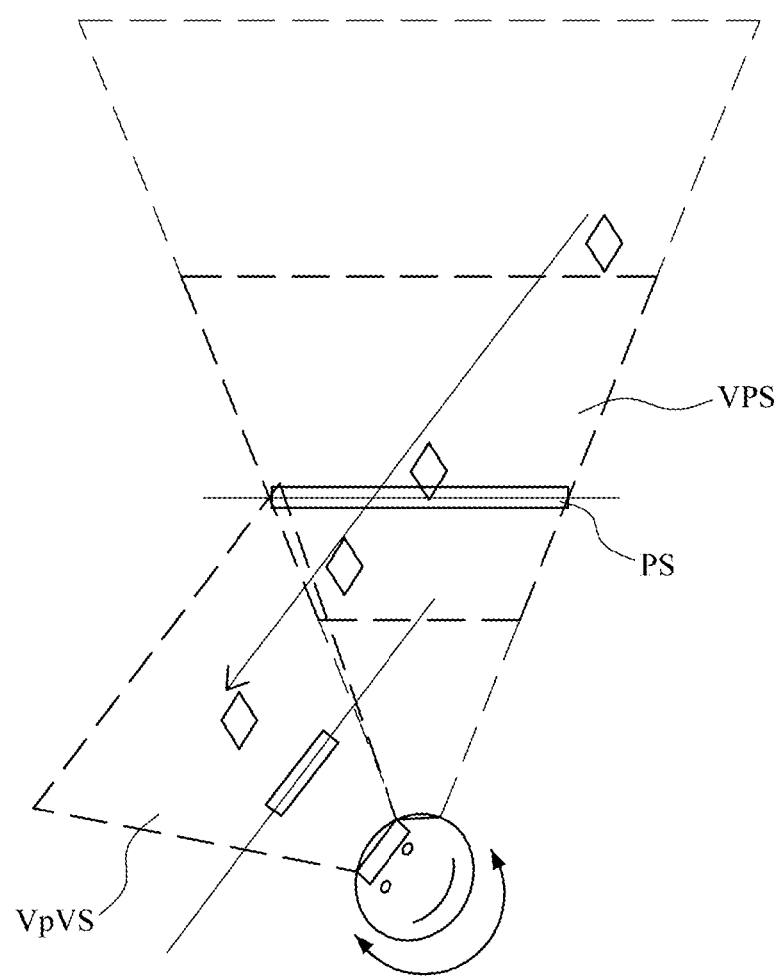
Figure 3C:
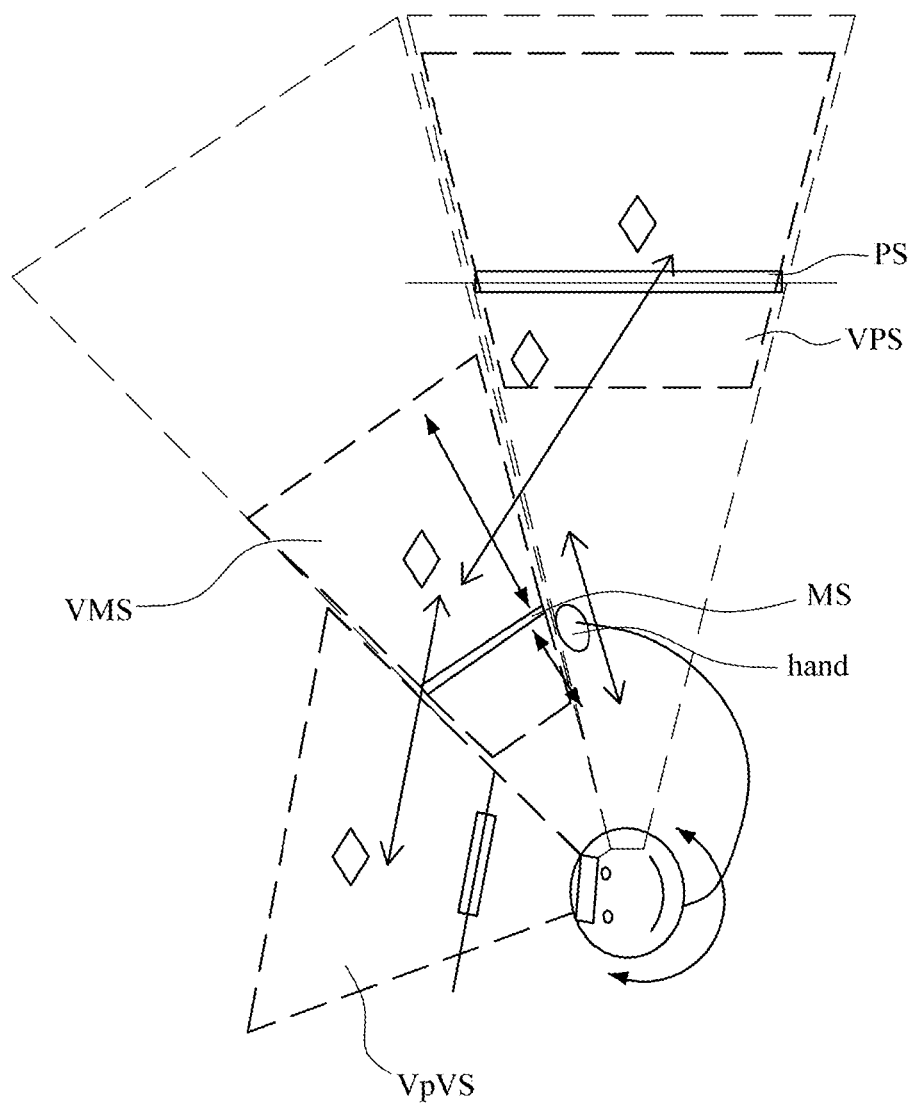
Figure 3D:
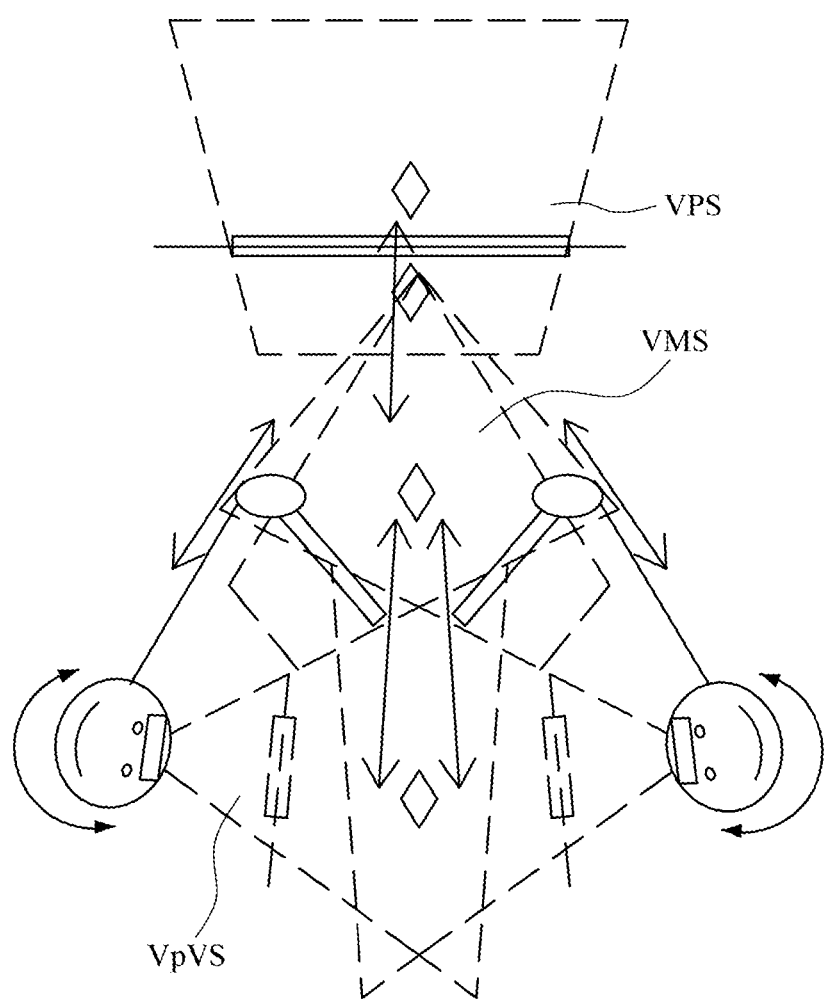

FIG. 3A illustrates a space expansion in a depth direction, FIG. 3B illustrates a space expansion in a horizontal direction outside a screen, FIG. 3C illustrates fusion utilization of a plurality of displays, FIG. 3D illustrates an example of content sharing in an E3D platform of a plurality of users and individual experience utilization.

Referring to FIG. 3A, in a case in which a viewer looks in a direction of the standing display and a diamond-shaped target object to be observed approaches the viewer, the display control unit transmits corresponding content to the wearable display device when the target object approaches the viewer outside a natural stereoscopic image display section (volume of PS: VPS) defined by a public screen (PS), to thereby enable 3D content to be naturally visualized in a VpVS region.

FIG. 3B illustrates a case in which a viewer moves his line of vision to the left.

Referring to FIG. 3B, even when a view point of a user is outside a stereoscopic image display space (VPS) of the standing display device, that is, outside a virtualization region of the public screen (PS), the stereoscopic images may be continuously displayed using the stereoscopic image display space (VpVS) of the wearable display device that is moved along a user view point.

Referring to FIG. 3C, when the portable display device which can display an additional screen (mobile screen: MS) is carried by the viewer, the stereoscopic image display space is segmented, so that the viewer may experience stereoscopic images represented in more natural and various spaces.

In particular, when using the portable display device shown in FIG. 3C, a narrow field of view (FOV) problem of the wearable display device can be overcome.

Referring to FIG. 3D, each of different users may experience the same stereoscopic image content protruding from a predetermined display from their own view points, as realistic 3D images. In this instance, each user may utilize his own portable display device, wearable display device, or the like.

In addition, the E3D technology proposed in the present invention can expand a stereoscopic image experience space in all directions so as to enable interaction such as directly touching a virtual object within a user's reach, and the like.

Figure 4:
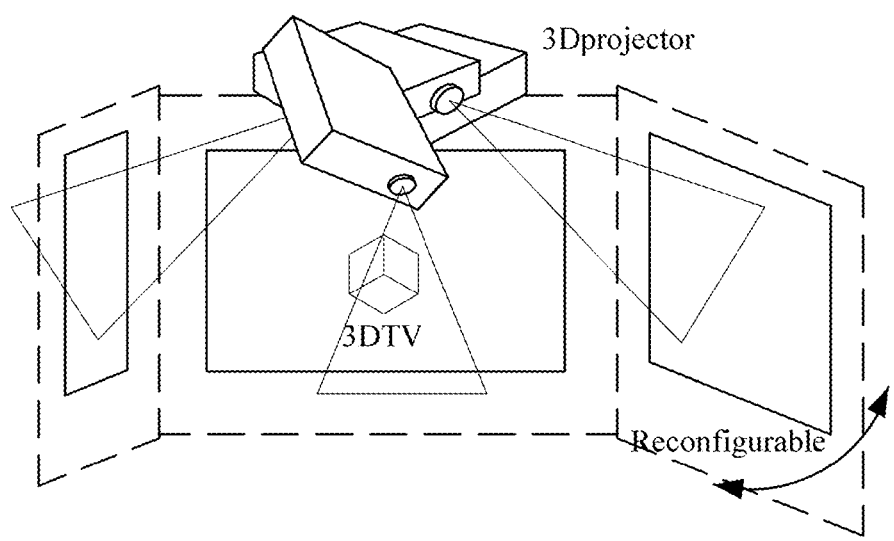
FIG. 4 is a drawing showing the external appearance of a standing display device included in an expanded 3D stereoscopic image display system according to an embodiment of the present invention.

FIG. 4 is a drawing showing the external appearance of a standing display device included in an expanded 3D stereoscopic image display system according to an embodiment of the present invention.

The standing display device includes a flat panel display device (for example, TV, 3D TV, projector, 3D projector, and the like), and an installation position of the standing display device is fixed. The standing display device may configure a space by mixing a single display device or a plurality of 2D and 3D display devices, and construct a display space in the form of CAVE that fills a peripheral space of a user to thereby expand a virtual participation space of the user to a space transcending physical walls.

The display device fused into an E3D may include a 6 DOF tracking device, and characteristics represented as "reconfigurable" in FIG. 4 indicate that a position and orientation of the display device can be changed while the system is operating.

In SW that operates the E3D platform, an image virtualization condition such as a disposition environment of the display and the like is received, and the received condition is reflected in 6 DOF information of a virtual camera for computer graphics rendering that generates each display image and a projection matrix, thereby virtualizing 3D content that is naturally fused even in a modified space.

The 6 DOF information may include X/Y/Z positional values, and pitch/yaw/roll angle values, and a computer graphics shader code that reflects optical information associated with virtualization image generation and characteristic information of an output screen may be added to the projection matrix.

Figure 5:
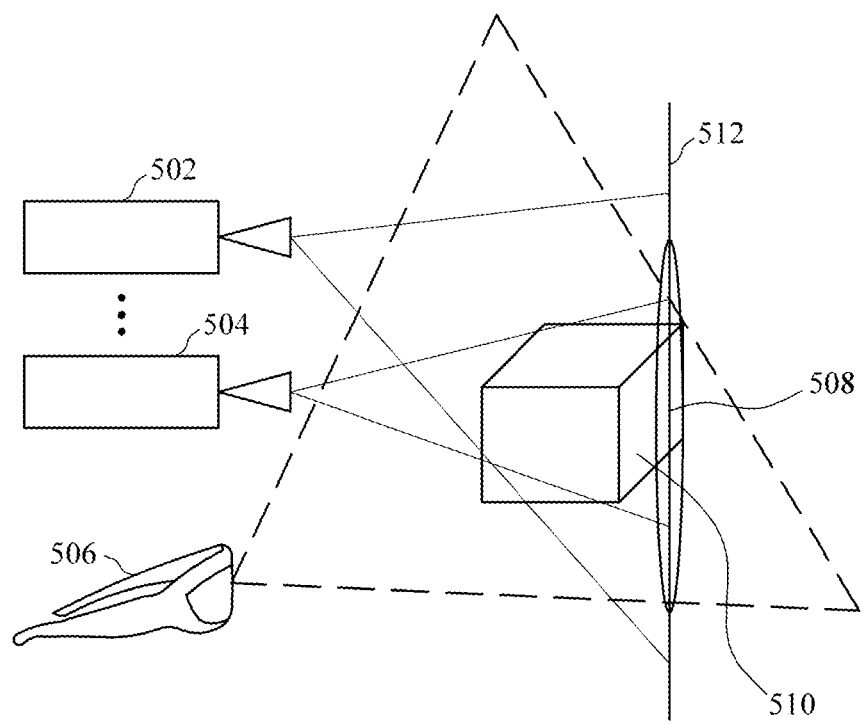
FIG. 5 is a reference diagram illustrating an example of mixing and outputting multiplex images using a plurality of standing display devices according to an embodiment of the present invention.

FIG. 5 is a reference diagram illustrating an example of mixing and outputting multiplex images using a plurality of standing display devices according to an embodiment of the present invention.

Referring to FIG. 5, by projecting images of several layers into the same stereoscopic image display space by utilizing a plurality of standing display devices, various 2D and 3D effects may be created in the same stereoscopic image display space.

Standing display devices 502 and 504 may be, for example, heterogeneous image projectors.

In FIG. 5, two image projectors are illustrated, but a number and a type of the image projectors are not limited thereto. A reference numeral 512 denotes a target object to be projected, for example, a wall surface or a display surface coated with a reflective material, and reference numerals 508 and 510 respectively denote a projected surface and content formed with respect to the projected surface, which is visualized in a 3D space.

In this instance, a user may experience content fused in the 3D space using a wearable display device 506.

Figure 6:
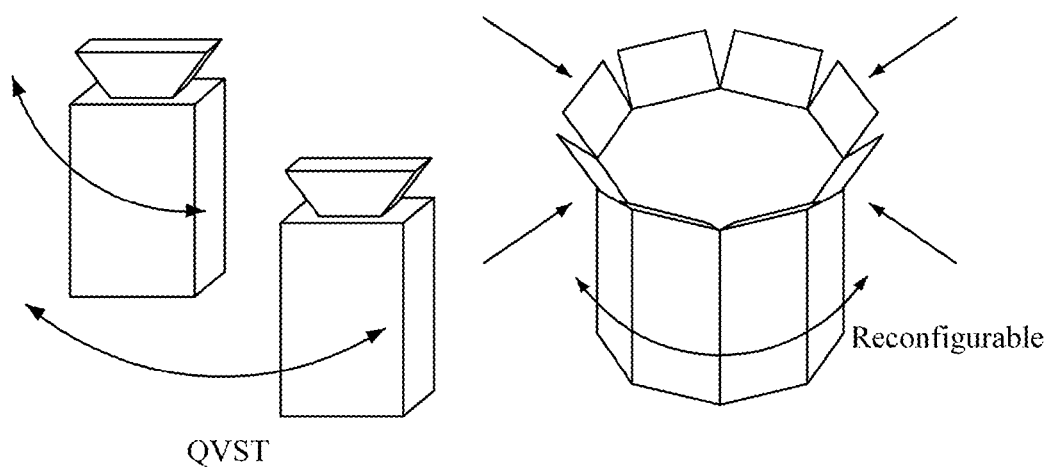
FIG. 6 is a drawing showing the external appearance of a flexible display device included in an expanded 3D stereoscopic image display system according to an embodiment of the present invention.

FIG. 6 is a drawing showing the external appearance of a flexible display device included in an expanded 3D stereoscopic image display system according to an embodiment of the present invention.

Referring to FIG. 6, the flexible display device may be a flexible display which enables triview-display, quadview-display, hexaview-display, and the like which are expanded based on dualview-display.

In addition, the flexible display device may include a standing display device including movable wheels or the like, for example, a mobile kiosk display.

According to an embodiment, a design of the dualview-display is changed to enable operations such as composition, decomposition, and the like in units of modules, whereby modules are reassembled and disposed in a peripheral space of the user so as to be suitable for a size of the stereoscopic image display space and content scenarios (virtualization position, movement trajectory of an object, and the like).

For example, the dualview-display is combined to form four modules, thereby is manufacturing the quadview-display capable of outputting a 360 degree-stereoscopic image.

In this instance, using characteristics of SW content that utilize the E3D platform, an effect in which content (for example, 3D ball, flight vehicle, and the like) are continuously moved between a plurality of homogeneous and heterogeneous display devices may be implemented.

In addition, like the above description of reconfiguration of the standing display device in FIG. 4, 6 DOFs of all display devices positioned in a demonstration space may be tracked.

Accordingly, even when the flexible display device or the like is moved in the demonstration space, content suitable for a movement position may be visualized, and content moved between the respective display devices may be controlled through software.

Figure 7A:
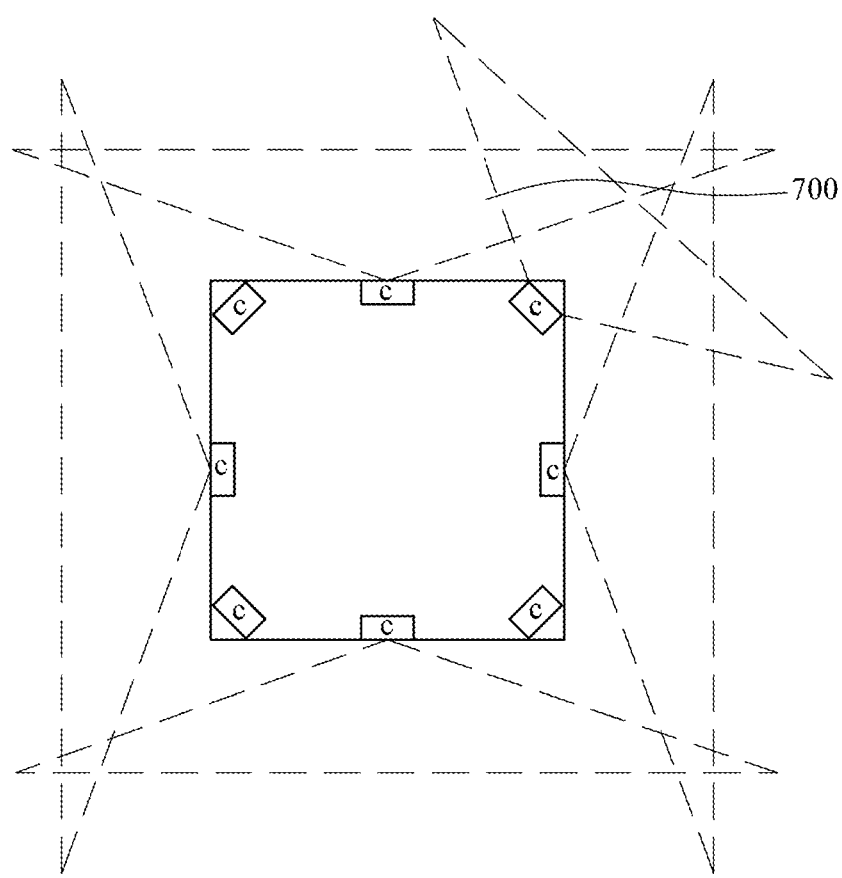
Figure 7B:
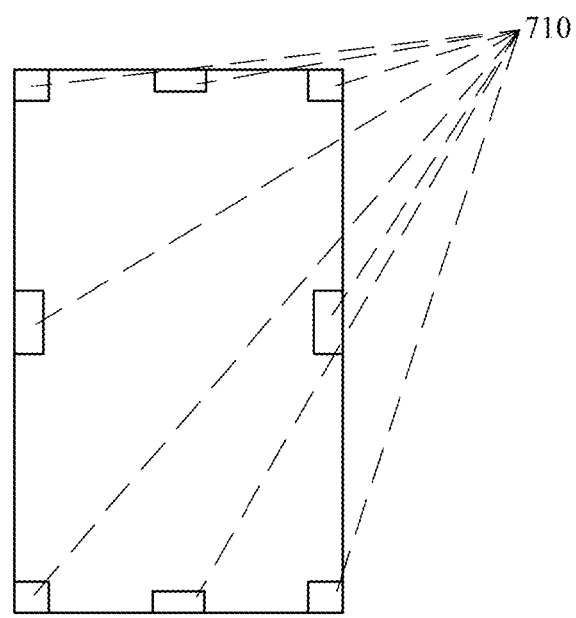

FIGS. 7A to 7C are reference diagrams illustrating an example in which a flexible display device according to an embodiment of the present invention is used.

According to an embodiment, a quadview see through (QVST) display that is a transparent quadview-display, as one of the flexible display devices, may visualize a 3D stereoscopic image similar to a hologram in a stereoscopic image display space as shown in FIGS. 7A to 7C, and provide a user with an environment of real multi-modal sensory stimulation through user interaction.

The user interaction may be performed in a touch scheme, a gesture scheme, or the like.

According to an embodiment, as shown in FIGS. 7A and 7B, 2D or/and 3D display devices and a 3D camera are disposed on surfaces and edges of a QVST display device including a control unit, so that similar effects as those of a transparent display may be obtained by projecting a stereoscopic image display space physically located on a rear side of the device.

The 3D camera may be Microsoft's KINECT. A reference numeral 700 of FIG. 7A indicates a view volume capable of acquiring images by a camera, and a reference numeral 710 is of FIG. 7B indicates a 3D camera.

Considering a limitation in a field of view (FOV, view volume) of a single camera, a maximum of 12 cameras may be disposed at edges of the device in the case of a hexahedron, and images photographed by a virtual camera may be generated utilizing a camera view interpolation scheme of computer vision and computer graphics fields in a middle region between the cameras.

According to an embodiment, when there is a desire to use flexible display device such as a transparent window display, the following method may be used.

As an example, a transparent display panel in which a rear portion of a glass window screen is viewed may be used.

As another example, referring to FIG. 7C, when using an opaque general display device, space image information of a rear portion of the device which is acquired from cameras located in an area A 720 is output to a screen of an area E 722.

Here, images viewed at various angles are acquired through a plurality of cameras positioned in the area A 720, and line of vision information (positions and angles of a user's eyes as the user views the screen) of a user of a position B 730 is tracked utilizing the camera positioned in the area E 722, and therefore images of corresponding areas C 740 are output to thereby provide an effect as if a user views a transparent window.

Through the plurality of cameras in the above-described structure, required images may be output by simultaneously reconstructing peripheral images of the QVST.

For example, referring to FIG. 7C, when an inside of a main body of the QVST display device is represented as a transparent space, and 3D content (for example, a planetary space) is visualized in the transparent space, an image is generated in the area E 722 that is a position of a virtual camera from space information acquired from the plurality of cameras of the area A 720, and an image D 750 of a rear portion of the device is continuously visualized such as in the area C 740.

According to an embodiment, the flexible display device may have an optical see-through area 760 and a camera-based see-through area 770.

The optical see-through area 760 uses natural human vision, and the camera-based see-through area 770 is an external image acquisition area, that is, an area in which a camera and user vision are linked using the camera.

In this instance, as shown in FIG. 7C, content may be experienced via a method (for example, touch screen or interaction such as 3D gesture) in which content (for example, a specific planet) formed in a virtual transparent display space of a main body of the quadview display device is selected by a user, and the selected content is moved to the optical see-through area 760 in an upper portion of the device.

A reference numeral 780 indicates that content in a lower portion of the device is moved to an upper portion thereof or enlarged.

Figure 8A:
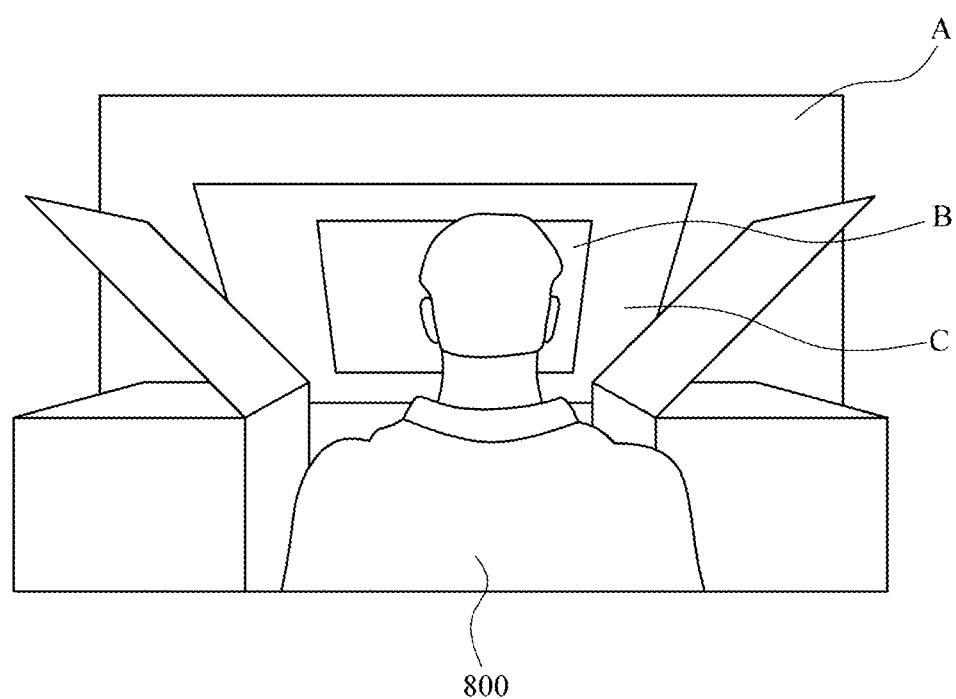
FIGS. 8A to 8C are reference diagrams illustrating an example in which a flexible display device according to another embodiment of the present invention is used.
Figure 8B:
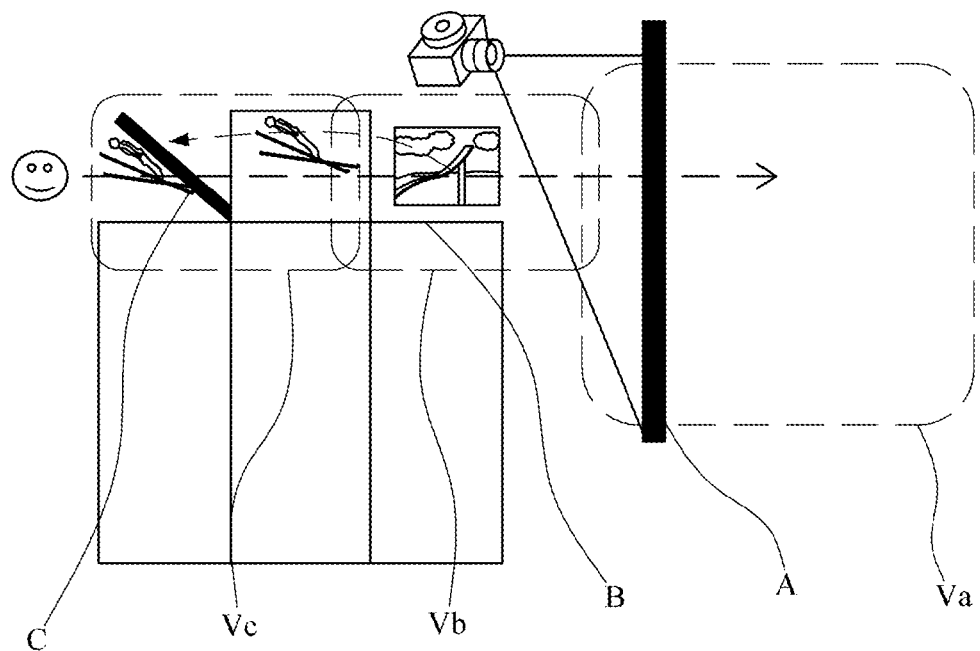
Figure 8C:
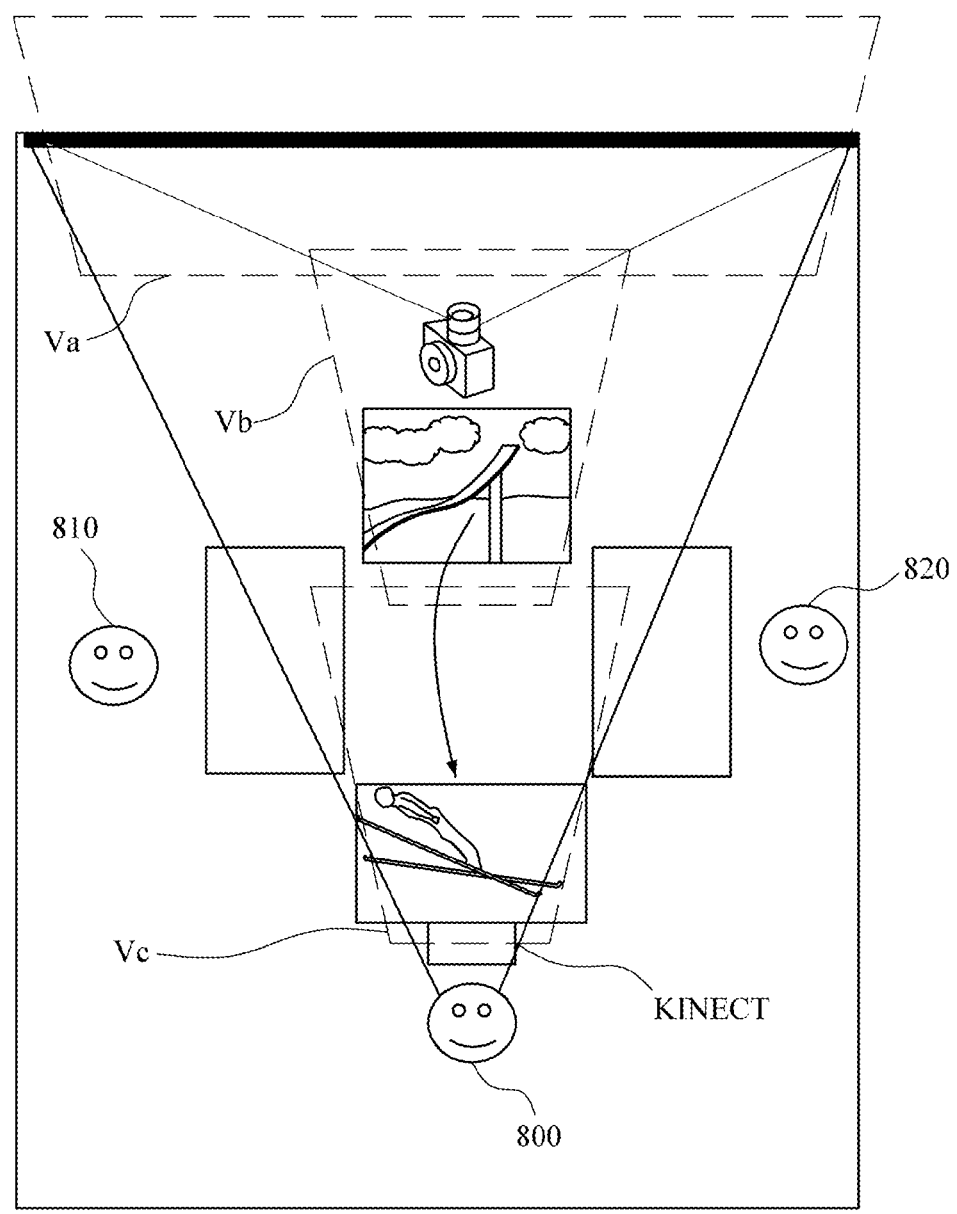

FIGS. 8A to 8C are reference diagrams illustrating an example in which a flexible display device according to another embodiment of the present invention is used.

In FIGS. 8A to 8C, a structure in which a mobile display is designed in the form of a triview display is illustrated.

As shown in FIGS. 8A to 8C, when a dualview display device is disposed in a line of vision of a primary user 800, and a screen used as a background is installed, at least two screens (three screens in FIGS. 8A to 8C) to which images are physically output may be disposed.

A single physical screen forms a stable 3D stereoscopic image display space that does not cause visual fatigue, and therefore an effect in which three stereoscopic image display spaces Va, Vb, and Vc are continuously set may be created.

A stable stereoscopic image visualization area belonging to a screen is defined in the form of a rectangular horn; however, for convenience of description, a rectangular area is illustrated.

When content, for example, a ski jump, is displayed on the sequential 3D stereoscopic image display space, large mountainous terrain as the background on a screen A, a ski jump is displayed on a screen B, and a ski jumper is displayed on a screen C, so that the primary user 800 may effectively experience a 3D effect of the ski jumper approaching the primary user 800 from the ski jump, and viewers 810 and 820 may experience the 3D effect of the ski jumper flying across an inner space of the flexible display device when the ski jumper skis down a slope.

Therefore, as shown in FIGS. 8A to 8C, the E3D platform of the present invention can naturally output 3D content from a user's periphery to his/her front.

Figure 9:
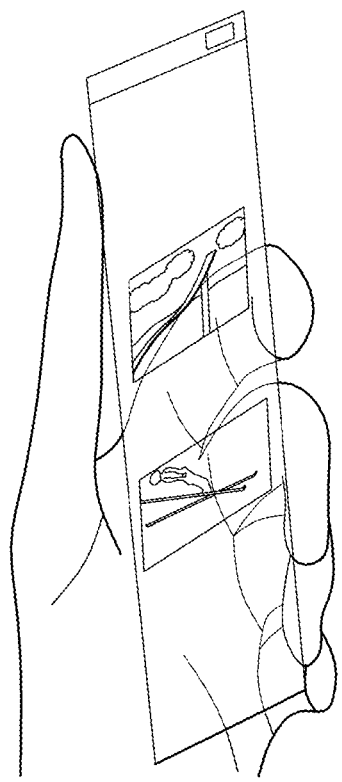
FIG. 9 is a drawing showing the external appearance of a portable display device included in an expanded 3D stereoscopic image display system according to an embodiment of the present invention.

FIG. 9 is a drawing showing the external appearance of a portable display device included in an expanded 3D stereoscopic image display system according to an embodiment of the present invention.

It is assumed that a display device can basically implement a see-through function in order to fuse multiple stereoscopic images in an E3D platform.

However, a display that does not support the see-through function such as a current commercial portable display may implement a virtual see-through effect via a method of simultaneously rendering 3D content positioned in a rear portion of the display.

For example, in the portable display device, a motion parallax human factor effect may be implemented utilizing a head tracking function such as in head-coupled perspective technology to thereby implement a virtual 3D display.

The motion parallax human factor effect uses characteristics in which parallax is formed depending on movement of content or movement of a user viewing the content.

As another example, a transparent display panel utilizing OLED technology or the like is commercially available, and therefore a portable display for the E3D platform may be implemented utilizing this.

In this instance, 3D content may be visualized in a see-through panel (STP) via a method in which a filter for displaying a single stereoscopic image, or a high-frequency (Hz) filter for displaying an active stereoscopic image, is integrated into the see-through panel to thereby output an image with binocular disparity.

As another example, using a method utilized in an autostereoscopic 3D display panel, for example, by integrating a lenticular lens or a parallax barrier into the see-through panel, the portable display device for the E3D platform may be manufactured.

Figure 10:
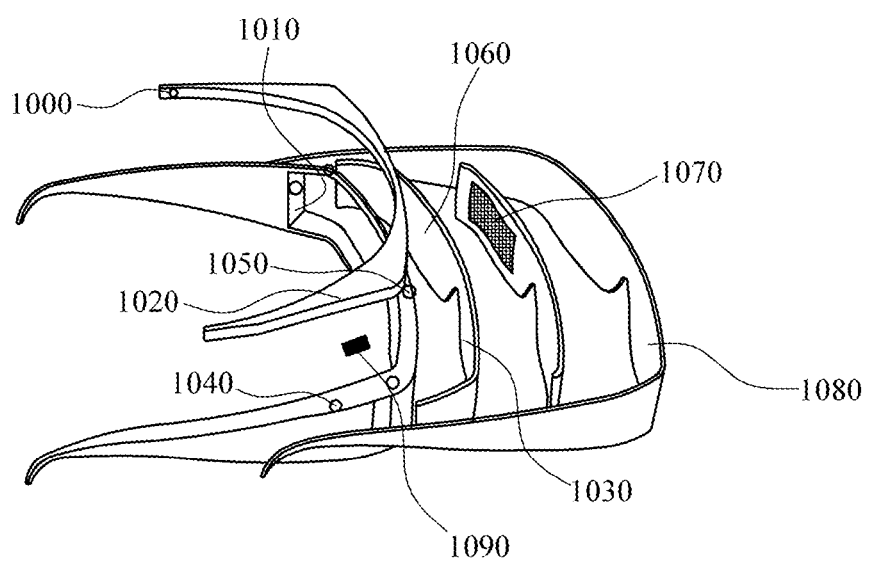
FIG. 10 is a diagram illustrating a structure of an EGD included in an expanded 3D stereoscopic image display system according to an embodiment of the present invention.

FIG. 10 is a diagram illustrating a structure of an EGD included in an expanded 3D stereoscopic image display system according to an embodiment of the present invention.

With regard to an expanded 3D stereoscopic image display process using an eye glass display (EGD) according to the present invention, visual information of a user such as a user's position, a position of eyes, a line of vision, a focal length, and the like are extracted, stereoscopic image signals are generated in accordance with the extracted visual information, and the stereoscopic image signals and images of the user's actual surroundings are synthesized to thereby output multiple external image signals to the user.

The EGD of the present invention includes a body-contacting line of eye tracker 1000 for line of vision tracking of a user, and a non-body-contacting line of eye tracker 1010.

In addition, the EGD of the present invention may further include an electronic curtain 1020 for increasing a degree of immersion, a multi-optical focus control lens 1030, an environment information acquisition sensor 1040, a position tracking sensor 1050, an optical see-through lens 1060, a mask for layered multiple display 1070, an external stereoscopic display-linked filter 1080, and an ultra-small image projection unit 1090.

The body-contacting line of eye tracker 1000 tracks a line of vision of a user by acquiring electrooculogram (EOG) signals in a user's periphery.

A detailed function of the body-contacting line of eye tracker 1000 will be described below with reference to FIGS. 11A and 11B.

The non-body-contacting line of eye tracker 1010 tracks the line of vision of the user through optical sensing using optical fiber.

A detailed function of the non-body-contacting line of eye tracker 1010 will be described below with reference to FIG. 12.

The electronic curtain 1020 increases low-level immersion in a space outside a glass frame, which can be felt in a general glasses-type display device, and electronically controls transmittance and brightness to ensure safety of walking, as necessary.

Accordingly, a user may obtain high-level immersion by actively separating an image inside the EGD from an external environment.

In general, each of HMD and EGD has a structure for presenting a large-sized image to a user through an optical system in which a micro output module enlarges the image, so that the optical system having a single focal length forms a virtual screen only in a fixed position.

The multi-optical focus control lens 1030 may include an ultra small liquid lens and an electronic focus control lens having the same form as a general lens, and may change a focal length of the optical system so that an image is formed at a suitable distance for each of various scenarios.

The environment information acquisition sensor 1040 measures quantity of light of an external environment to adjust brightness of an image inside and outside the display device, and controls transmittance with respect to an overall external image or a specific position, so that fused multiple images of the EGD have natural brightness.

The position tracking sensor 1050 senses a head position and orientation information values of a user wearing the EGD.

The optical see-through lens 1060 is a lens that reflects an image of the ultra-small image projection unit 1090 to form the reflected image at a predetermined distance in front of user's eyes on a virtual screen, and is an optical element having half-mirror characteristics in which an external image is partially viewed optically.

The mask for layered multiple display 1070 actively adjusts transmittance of an external image mixed with a virtual image screen of the E3D EGD, and is an electronic element acting as a mask that adjusts overall quantity of light entering from the outside of the device or controls the quantity of light in units of pixels.

The external stereoscopic display-linked filter 1080 includes a module mounted therein for receiving signals of various stereoscopic image output devices which are generated outside the EGD device, and is an element that simultaneously mixes results of the stereoscopic image output devices of various techniques to view the mixed results.

The ultra-small image projection unit 1090 is an ultra-small projector element having a size capable of mounting inside a glass frame such as in a pico-projector.

Figure 11A:
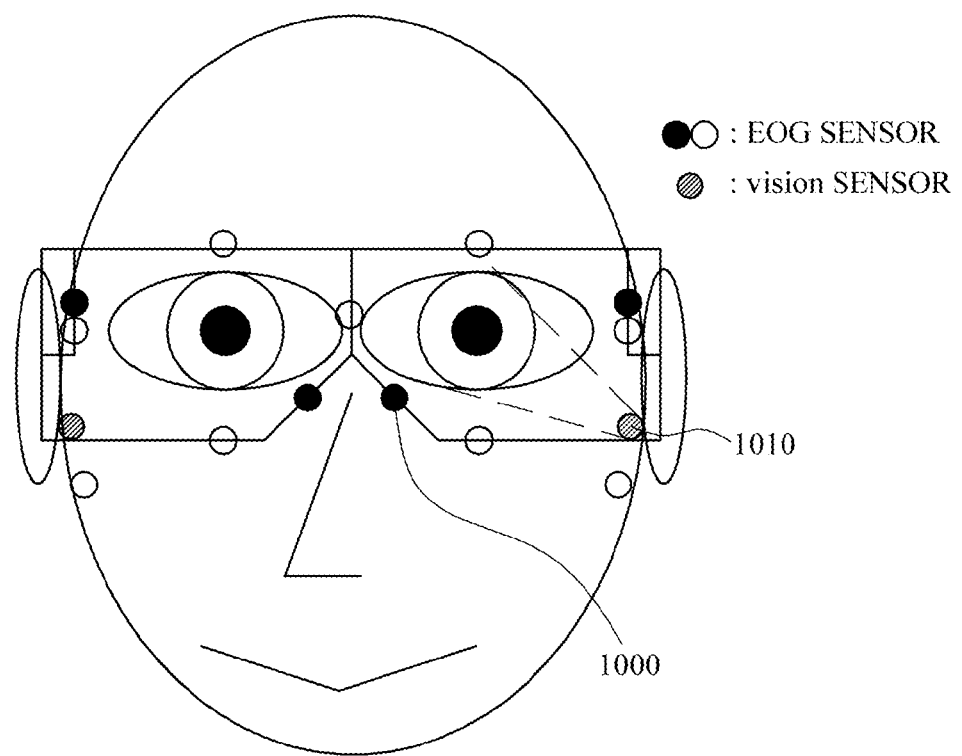
FIGS. 11A and 11B drawings showing the external appearance an EGD including a body-contacting line of eye tracker and a non-body-contacting line of eye tracker.
Figure 11B:
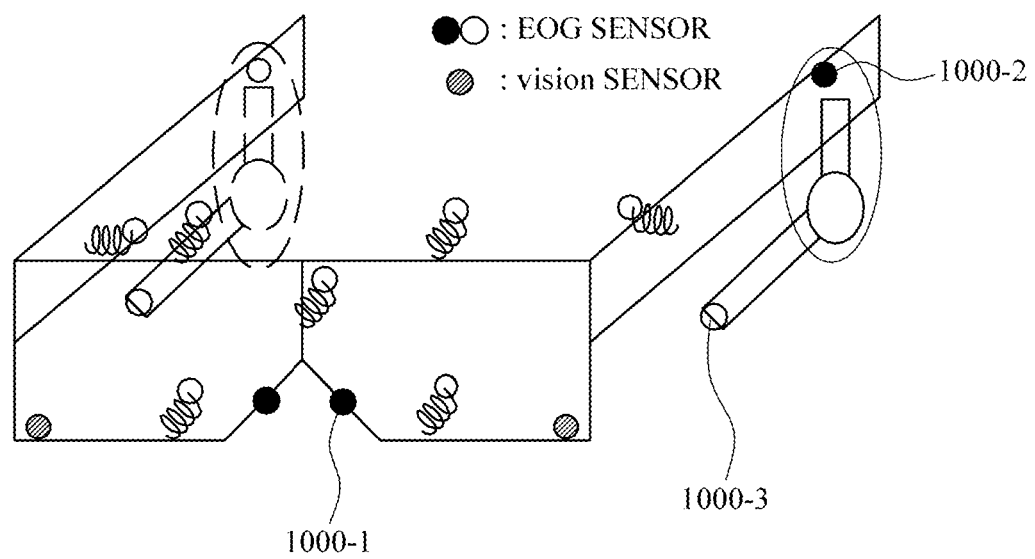

FIGS. 11A and 11B drawings showing the external appearance an EGD including the body-contacting line of eye tracker 1000 and the non-body-contacting line of eye tracker 1010.

The E3D platform of the present invention requires user eye movement tracking information in addition to user head position tracking information in order to realize multi-stereoscopic image fusion with precision.

A general virtual and augmented reality system is limited to user head position tracking The present invention combines the advantages of an EOG-based method in which muscle movement around the user eyes is tracked using electromagnetic signals through the body-contacting line of eye tracker 1000 to thereby reconstruct the tracked muscle movement, and a vision-based method utilizing a computer vision and image processing technique through the non-body-contacting line of eye tracker 1010.

That is, in the present invention, by resolving a wearability problem, which is a disadvantage of the EOG-based method, and a continuity support problem, which is a disadvantage of the vision-based method, a method required for miniaturization of the device is proposed.

The continuity support problem refers to an inability to track the line of vision of a user when the user closes his/her eyes, and stable line of vision information may be continuously acquired through the EOG-based method.

According to an embodiment, the body-contacting line of eye tracker 1000 is disposed in a portion that contacts a user's face, for example, a nose support 1000-1, an ear support 1000-2, and the like, as shown in FIGS. 11A and 11B, in the form of an electrode for acquiring EOG signals.

In addition, in order to acquire additional signals, the electrode for acquiring EOG signals may be additionally disposed in a portion other than the portion that contacts the user's face. For example, as shown in FIG. 11B, the electrode for acquiring EOG signals may be additionally mounted in a headset portion 1000-3 including an earphone and a microphone to thereby acquire the EOG signals.

FIG. 12 is a drawing showing the external appearance of a non-body-contacting eye tracking unit according to an embodiment of the present invention.

EOG signals enabling real-time signal acquisition are obtained by measuring minute changes in current and voltage, and thereby may be affected by peripheral electromagnetic noise. According to the present invention, a filtering function is realized utilizing vision-based image information of the non-body-contacting line of eye tracker 1010 to thereby acquire stable signals.

A vision sensor is made miniature and light-weight by utilizing the optical fiber-based non-body-contacting line of eye tracker 1010 as shown in FIG. 12, instead of a camera-based module that is difficult to mount in the portion of the EGD that contacts the human body because of its large size and weight.

The optical fiber-based non-body-contacting line of eye tracker 1010 proposed in the present invention is a hybrid type which can be integrated with the image information output unit denoted by reference numeral 1010-1, and therefore a 3D vector of a line of vision of a user, a focal length, and the like may be acquired in real-time by utilizing the eye image information acquired through the image information output unit.

Therefore, information concerning a state in which a user views a target object located at a specific position and direction in a user's peripheral 3D space may be acquired with precision, and the acquired information may be utilized as important reference information when selecting a display device for representing a current target object to be observed or controlling an image output parameter based on a human impact factor.

The optical fiber-based non-body-contacting line of eye tracker 1010 may extract line of vision information of the user to acquire reflected image information, as shown by reference numeral 1010-2.

In the expanded 3D stereoscopic image display system according to an embodiment, it is possible to overcome limitations of the existing technology that represents a limited sense of 3D space using a single 3D stereoscopic image display device.

Specifically, the expanded 3D stereoscopic image display system according to an embodiment of the present invention can provide a display platform that presents integrated services by fusing homogeneous and heterogeneous display devices in a single space, and an operation technique of the display platform. It can thereby reproduce for a user a full experience with respect to the 3D stereoscopic image, eliminating visual fatigue caused by viewing 3D stereoscopic images in which depth is exaggerated, and providing a natural sense of 3D space for 3D stereoscopic images.

More specifically, according to the present invention, a method of mixing and visualizing images in the same stereoscopic image display space through a multi-standing display device, a method of implementing a modular structure enabling various changes in a flexible display device and a transparent display space, a method of utilizing a portable display device and a transparent display panel as an E3D platform, a method of tracking a line of vision of a user in a highly precise and stable manner using a hybrid scheme mixing at least two sensors in a wearable display device, a method of controlling a shielding film utilizing an external environment sensor, and a method of controlling a multi-optical focus to change image positions of various virtual screens for each of user interaction scenarios as necessary, can be provided.

According to the present invention, various 3D stereoscopic image content services which overcome limitations in the realistic representation of 3D space and are supported by current display devices can be provided, and therefore the present invention can be utilized as key technology for implementing virtual reality and mixed reality systems in various fields such as 3D display platform-based consumer electronics, education, training, medical and military fields, etc.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An expanded 3D stereoscopic image display system, comprising:
 a plurality of display devices that provide 3D stereoscopic image display spaces; and
 a control unit to set the 3D stereoscopic image display spaces for the plurality of display devices, respectively, by dividing or sharing a physical space for displaying a 3D stereoscopic image, and distribute content to at least one of the display devices based on at least one of the 3D stereoscopic image display spaces set for the display devices, production scenario of the content, and line of vision information of a user to thereby fuse multiplex 3D stereoscopic images in a single stereoscopic image display space,
 wherein at least one of the plurality of display devices is a wearable display device that detects eye movement to acquire the line of vision information of the user, and
 wherein the wearable display device comprises:
  a body-contacting line of eye tracker that acquires an electrooculogram (EOG) signal around the user to track a line of vision of the user; and
  a non-body-contacting line of eye tracker that tracks the line of vision of the user through optical sensing using optical fiber.

2. The expanded 3D stereoscopic image display system according to claim 1, wherein the body-contacting line of eye tracker includes an electrode for acquiring the EOG signal mounted in a place including a portion of the wearable display device that contacts a user's face and a predetermined portion of a component mounted in the wearable display device.

3. The expanded 3D stereoscopic image display system according to claim 2, wherein the component mounted in the wearable display device is an accessory including an earphone or a headphone.

4. The expanded 3D stereoscopic image display system according to claim 1, wherein the non-body-contacting line of eye tracker acquires image information of an eyeball through optical sensing, and uses the acquired image information as reference information for selecting a display device to represent a target object to be observed by the user or adjusting an image output parameter based on a human impact factor.

5. The expanded 3D stereoscopic image display system according to claim 1, wherein the wearable display device further comprises:
 an electronic curtain that separates an image within the wearable display device from an external environment, and electronically adjusts transmittance and brightness.

6. The expanded 3D stereoscopic image display system according to claim 1, wherein the wearable display device further comprises:
 a multi-optical focus control lens that controls a focus to be formed at a variable position to change an image position of a virtual screen.

7. The expanded 3D stereoscopic image display system according to claim 1, wherein the wearable display device further comprises:
 an environment information acquisition sensor that measures environment information including quantity of light of an external environment to adjust brightness of an image inside the wearable display device.

* * * * *